(12) United States Patent
Vendrow et al.

(10) Patent No.: US 11,176,923 B1
(45) Date of Patent: Nov. 16, 2021

(54) SYSTEM AND METHOD FOR NOISE CANCELLATION

(71) Applicant: RingCentral, Inc., Belmont, CA (US)

(72) Inventors: Vlad Vendrow, Reno, NV (US); Ilya Vladimirovich Mikhailov, Saint-Petersburg (RU)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/222,952

(22) Filed: Apr. 5, 2021

(30) Foreign Application Priority Data

Dec. 30, 2020 (WO) ................ PCT/RU2020/000790

(51) Int. Cl.
*G10L 17/06* (2013.01)
*G10K 11/178* (2006.01)
(Continued)

(52) U.S. Cl.
CPC ........ *G10K 11/17823* (2018.01); *G06F 3/165* (2013.01); *G06K 9/00335* (2013.01); *G06K 9/00362* (2013.01); *G06K 9/00711* (2013.01); *G10K 11/17873* (2018.01); *G10L 17/06* (2013.01); *G10L 25/57* (2013.01); *H04N 7/15* (2013.01); *G10K 2210/108* (2013.01); *G10K 2210/3027* (2013.01)

(58) Field of Classification Search
CPC ........ G06F 3/165; G06F 16/909; G06F 3/013; G06F 3/0481; G06F 40/35; G06F 3/0482; G06F 3/0487; G06F 11/3688; G06F 21/32; G06K 9/00221; G06K 9/00335; G06K 9/00362; G06K 9/00711; G06K 9/00255; G06K 9/00288; G10K 11/17823; G10K 11/1785; G10K 11/17873; G10K 2210/108; G10K 2210/3027; G10L 17/06; G10L 21/0264; G10L 25/57; G10L 15/02; H04L 12/1863; H04L 65/40; H04M 3/002; H04N 7/15; H04N 21/4318; H04N 21/25883; G01C 21/3822; G06T 7/38
USPC ......... 348/14.08, 14.09; 370/286; 379/88.02; 381/71.1; 704/270; 345/473; 382/103
See application file for complete search history.

(56) References Cited

U.S. PATENT DOCUMENTS

| | | | |
|---|---|---|---|
| 6,078,566 A * | 6/2000 | Kikinis .................. | H04M 3/18 370/286 |
| 6,195,104 B1 * | 2/2001 | Lyons ................ | H04N 5/23219 345/473 |

(Continued)

OTHER PUBLICATIONS

PCT International Search Report, dated Sep. 16, 2021 for PCT International Application No. PCT/RU2020/000790, 2 pages.

(Continued)

*Primary Examiner* — Gerald Gauthier

(57) ABSTRACT

A method includes receiving a video data associated with a user in an electronic conference. The method further includes receiving an audio data associated with the user in the electronic conference. It is appreciated that the video data is processed to determine one or more actions taken by the user, and wherein the processing identifies a physical surrounding of the user. The method further includes identifying a portion of the audio data to be suppressed based on the one or more actions taken by the user during the electronic conference and further based on the identification of the physical surrounding of the user.

24 Claims, 6 Drawing Sheets

(51) Int. Cl.
*G10L 25/57* (2013.01)
*G06K 9/00* (2006.01)
*G06F 3/16* (2006.01)
*H04N 7/15* (2006.01)

(56) References Cited

U.S. PATENT DOCUMENTS

| | | | | |
|---|---|---|---|---|
| 8,681,203 | B1* | 3/2014 | Yin | H04N 7/15 |
| | | | | 348/14.08 |
| 9,342,930 | B1* | 5/2016 | Kraft | G06F 3/04842 |
| 10,019,346 | B2* | 7/2018 | Luan | G06F 11/3684 |
| 10,755,106 | B1* | 8/2020 | Bakry | G06K 9/0063 |
| 11,082,460 | B2* | 8/2021 | Nesta | G06T 7/73 |
| 2002/0101505 | A1 | 8/2002 | Gutta et al. | |
| 2007/0165820 | A1 | 7/2007 | Krantz et al. | |
| 2011/0257971 | A1 | 10/2011 | Morrison | |
| 2012/0169835 | A1* | 7/2012 | Woo | H04L 12/1827 |
| | | | | 348/14.09 |
| 2014/0337016 | A1 | 11/2014 | Herbig et al. | |
| 2014/0379351 | A1* | 12/2014 | Raniwala | G06K 9/00335 |
| | | | | 704/270 |
| 2015/0208031 | A1* | 7/2015 | Lievens | G06F 3/0346 |
| | | | | 348/14.08 |
| 2015/0331490 | A1 | 11/2015 | Yamada | |
| 2015/0365759 | A1* | 12/2015 | Dimitriadis | G06K 9/00684 |
| | | | | 381/71.1 |
| 2016/0042226 | A1* | 2/2016 | Cunico | G06N 5/022 |
| | | | | 382/103 |
| 2016/0180571 | A1* | 6/2016 | Anderson | G11B 27/031 |
| | | | | 345/473 |
| 2016/0182727 | A1* | 6/2016 | Baran | G08B 21/18 |
| | | | | 379/88.02 |
| 2017/0104957 | A1* | 4/2017 | Farrell | G06F 3/04842 |
| 2017/0318260 | A1* | 11/2017 | Torres | H04L 65/403 |
| 2018/0041639 | A1 | 2/2018 | Gunawan et al. | |
| 2018/0048859 | A1* | 2/2018 | Episkopos | G09B 21/009 |
| 2018/0068174 | A1* | 3/2018 | Gottlieb | G06K 9/00255 |
| 2018/0220231 | A1* | 8/2018 | Thakkar | G10K 11/17857 |
| 2018/0278504 | A1* | 9/2018 | Alazraki | H04L 43/04 |
| 2018/0288478 | A1* | 10/2018 | Durham | H04N 21/4542 |
| 2019/0011703 | A1* | 1/2019 | Robaina | G06F 3/013 |
| 2019/0068389 | A1* | 2/2019 | Chitre | H04L 51/18 |
| 2019/0340817 | A1* | 11/2019 | Bostick | G06F 8/30 |
| 2020/0110572 | A1* | 4/2020 | Lenke | H04N 7/15 |
| 2020/0110928 | A1* | 4/2020 | Al Jazaery | G06K 9/00335 |
| 2020/0304644 | A1* | 9/2020 | Jia | H04M 3/002 |
| 2020/0314483 | A1* | 10/2020 | Rakshit | H04N 7/141 |
| 2021/0034870 | A1* | 2/2021 | Ha | G06K 9/6202 |
| 2021/0135895 | A1* | 5/2021 | Cheung | H04L 12/1822 |
| 2021/0164786 | A1* | 6/2021 | Young | G06F 16/909 |
| 2021/0166714 | A1* | 6/2021 | Linton | G10L 19/26 |

OTHER PUBLICATIONS

PCT Written Opinion of the International Searching Authority, dated Sep. 16, 2021 for PCT International Application No. PCT/RU2020/000790, 5 pages.

* cited by examiner

SYSTEM AND METHOD FOR NOISE CANCELLATION

CROSS-REFERENCE TO RELATED APPLICATIONS

This application is a continuation of an claims the benefit of prior-filed International Application No. PCT/RU2020/000790, filed on Dec. 30, 2020.

TECHNICAL FIELD

The present disclosure relates generally to the field of computer supported conferencing. More specifically, and without limitation, this disclosure relates to systems and methods for identifying one or more portions of an audio data to be suppressed during an electronic conference.

BACKGROUND

Recent advancements in technology and in particular online technology, has led to increased use of conferencing systems. For example, it is often the case that members of the same team or different teams that work together are in different geographical locations. Accordingly, use of conferencing systems plays an integral role in modern businesses. Moreover, advancement in technology and mobility enables team members to be on-the-go and yet attend their conference calls, e.g., either through video or audio or both. For example, one team member may be at a train station, another may be on a bus, yet another may be in the office and yet another team member may be picking up his/her child from school, as a nonlimiting example. Since different users are in different geographical locations, each user may be subject to a different unwanted audio (i.e. noise), e.g., train passing by, bus engine roaring, children playing, etc. If left unchecked, the unwanted audio results in poor conference quality and unwanted disruptions.

Unfortunately, there is currently no intelligent way to detect unwanted audio during an electronic conference in order to suppress the unwanted audio. Conventionally, users may mute their respective microphones or the system may mute all microphones unless explicitly unmuted by a given user, in order to control the level of unwanted audio during an electronic conference. Unfortunately, manually muting/unmuting is not only laborious but it results in unwanted audio when a user forgets to mute their microphone. Even when properly muted, a user that is unmuted in order to speak may be in a location with a lot of unwanted audio, e.g., child screaming in the background, train passing, bus engine roaring, etc., that is not being addressed. Some conventional systems may suppress certain audio data based on the audio signature, e.g., audio signature associated with music. Unfortunately, suppressing audio data only based on audio signature fails to consider other important factors, e.g., if the conference call is associated with a piece of music or if the conference call is a music lesson and the music is being suppressed based on the audio signature then the conference meeting is rendered useless.

SUMMARY

Accordingly, a need has arisen to intelligently determine whether a portion of an audio data received from a user, during an electronic conference, is unwanted. Once an unwanted portion of audio data is determined, remedial action may be taken, e.g., unwanted audio portion maybe suppressed. In some embodiments, a video data, e.g., video stream or still picture, from a user (i.e. participant) in an electronic conference may be used and processed in order to gain awareness of the user's environment, e.g., train station, office, bus, school, park, etc. It is appreciated that user's environment, contextual information regarding the meeting (e.g., title of the meeting, content of the conversation, content of data being shared, location of the meeting, etc.), one or more actions being taken by the user (e.g., lips moving, muting/unmuting pattern, direction at which the user is looking, whether the user is typing, etc.), direction of the audio data being received, voice recognition, etc., may be used to determine whether a portion of the audio data is unwanted (i.e. noise). Once the portion of the audio data is determined to be unwanted then it can be determined whether a remedial action should be taken, e.g., suppressing the identified audio portion.

In some embodiments, a method includes receiving a video data associated with a user in an electronic conference, e.g., video conference, audio conference, webinar, etc. The method further includes receiving an audio data associated with the user in the electronic conference. In some embodiments, the video data is processed to determine one or more actions taken by the user. It is appreciated that the processing of the video data identifies a physical surrounding of the user. A portion of the audio data to be suppressed is identified based on the one or more actions taken by the user, e.g., direction at which the user is looking, whether the user is typing, whether lips of the user are moving, muting/unmuting during the electronic conference, spoken words by the user, etc., during the electronic conference and further based on the identification of the physical surrounding of the user. In some nonlimiting examples, identifying a portion of the audio data to be suppressed may be further based on a contextual data, e.g., a title of the electronic conference, a content exchanged between users of the electronic conference, etc., associated with the electronic conference, as described above. It is appreciated that in some embodiments, identifying the portion of the audio data to be suppressed may be based on the directional angle of the audio data received by the microphone and agnostic to the content of the audio data. It is appreciated that in some embodiments, a depository of users voice profile is optionally accessed. In some nonlimiting examples, identifying the portion of the audio data to be suppressed may be based on the portion of the audio data mismatch with a voice profile associated with the user. The portion of the audio data to be suppressed may be suppressed.

In some embodiments, a method includes facilitating an electronic conference between a first user and a second user. A first audio data is received from the first user during the electronic conference. A first video data is received from the first user during the electronic conference. The first video data is processed to determine one or more actions taken by the first user. A physical surrounding of the first user is identified. It is appreciated that in some embodiments, a portion of the first audio data to be suppressed is identified based on the one or more actions taken by the first user during the electronic conference and further based on the identification of the physical surrounding of the first user. In some embodiments, a contextual data associated with the electronic conference is used to identify a portion of the first audio portion to be suppressed. In some nonlimiting examples, a voice profile of the first user is accessed and the portion of the first audio data to be suppressed is determined partially based on whether the portion of the first audio data mismatch the voice profile of the first user. A portion of the first audio data as identified is suppressed. In some embodiments, the first audio data is transmitted except for the portion of the first audio data to the second user.

These and other features and aspects of the concepts described herein may be better understood with reference to the following drawings, description, and appended claims.

DETAILED DESCRIPTION

Figure 1:
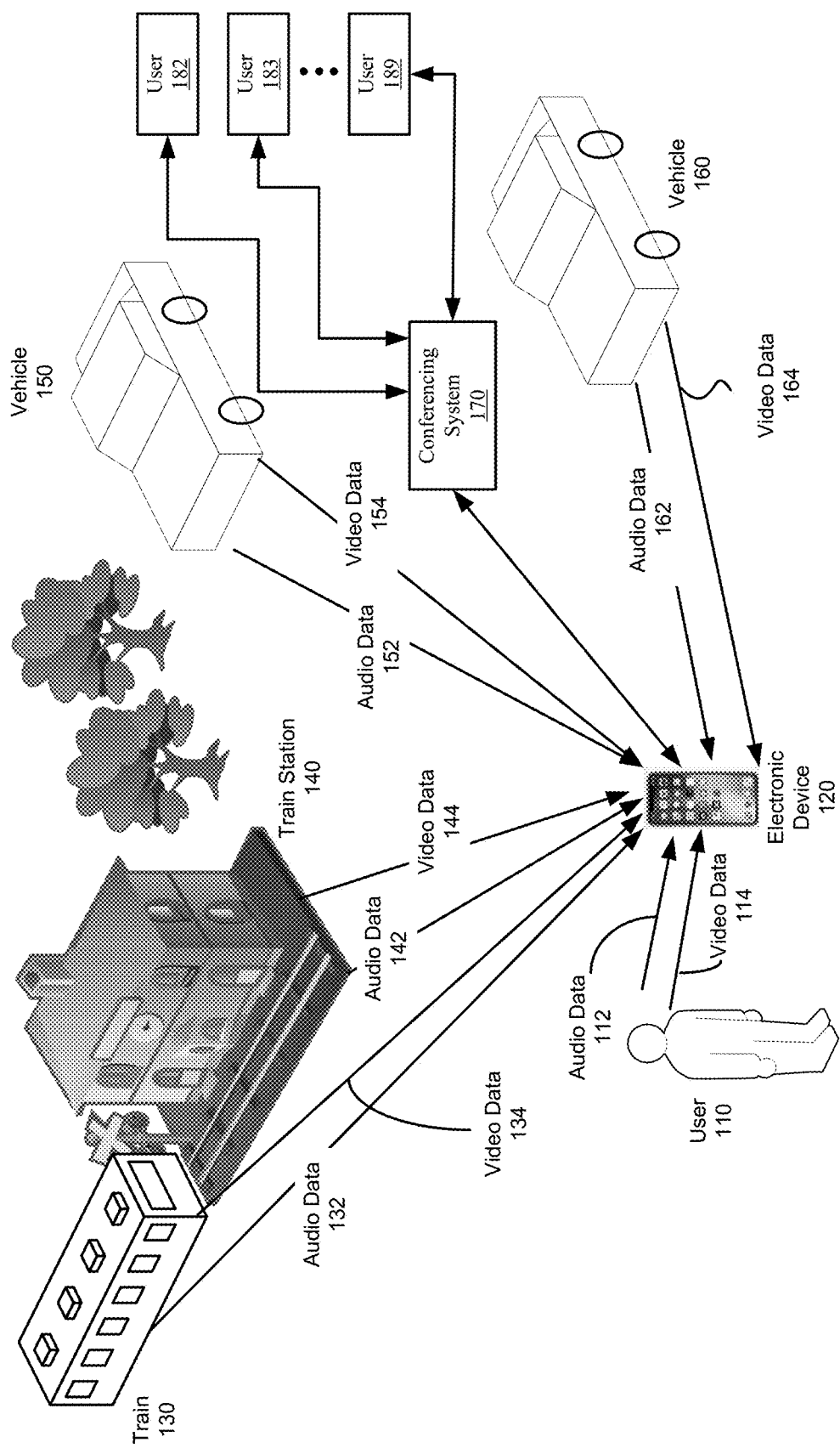
FIG. 1 is a diagram showing an example of user participating in an electronic conference and identification of unwanted audio portion during the electronic conference according to some embodiments.

The example embodiments described herein are directed to an electronic conferencing system. The electronic conferencing system is configured to facilitate communication between users. Communication may be through audio, video, webinar, or a combination thereof, e.g., via telephony and/or video conferencing, etc. It is appreciated that communication may facilitate other types of data exchanges, e.g., text, file, email, etc. It is appreciated that the term "user(s)" generally refers to participants of an electronic conferencing session.

As discussed, there is a need to intelligently determine whether a portion of an audio data received from a user, during an electronic conference is unwanted. For example, in a meeting with ten participants, an audio portion from a particular user may be identified as being unwanted audio (i.e. noise). Once an unwanted portion of audio data is determined, remedial action may be taken, e.g., unwanted audio portion maybe suppressed, the user may be muted, etc. It is appreciated that in some embodiments, suppressing the unwanted portion of the data may be suppressing the audio spectrum associated with unwanted audio portion and sustaining other audio spectrums, e.g., if a music in the background is identified as the unwanted audio portion then the music is suppressed whereas other audio data remains unsuppressed. It is appreciated that discussions with respect to identifying unwanted audio data and suppressing it is provided for illustrative purposes and should not be construed as limiting the scope of the embodiments. For example, in some embodiments wanted audio data may be identified instead and every audio data except for the wanted audio data may be suppressed.

It is appreciated that awareness of the user(s)' environment during the electronic conference can be used to more accurately identify unwanted audio portion(s). It is appreciated that the user(s)' environment can be identified to also identify wanted audio portion(s). In some embodiments, the environment that each user of the electronic conference is in is determined from video data, e.g., video stream or still picture, captured from a camera of each user. In other words, a camera of the electronic device or a camera positioned within a vicinity of the user may be used by each user to participate in the electronic conference is used to capture video data (i.e. video stream of data or still images) of the surroundings of each user. Processing of the captured video data identifies the surroundings of each user, e.g., train station, office, bus, school, park, etc. In one nonlimiting example, one user may be determined to be at a train station, another may be determined to be on a bus, another may be determined to be at home, and others may be determined to be in the office during the electronic conference session.

Awareness of each user environment during the electronic conference can be used to determine unwanted audio portion(s). For example, if a user is at a train station then it may be determined that noise associated with train passing by is unwanted audio and that remedial action should be taken, e.g., suppressed. As another example, if a user is determined to be on a bus then it may be determined that noise associated with being aboard the bus is unwanted audio and that remedial action should be taken, e.g., an audio portion should be suppressed (e.g., 2 minutes out of 5 minutes that the user is onboard the bus should be suppressed), particular audio portion associated with the unwanted audio should be suppressed (e.g., the audio spectrum associated with the bus, e.g., bus engine roaring, background noise of a crowd talking, etc., is filtered out while user's spoken word is not), the user is muted, etc. It is appreciated that the user's environment may further be identified using a global positioning system (GPS) of the electronic device associated with the user in conjunction with the camera or without the camera to identify the user's environment. It is appreciated that in some nonlimiting examples, base station triangulation may be used identify the location of the user instead of using the GPS of the electronic device. In some embodiments, geolocational positioning of the user may be used along with database information, e.g., Google® map (street view), etc., to determine the environment surrounding that the user, who is attending the electronic conference. According to some embodiments, any combination of the processes above may be used to determine user's environment.

It is appreciated that user's environment along with other types of information can be used to more accurately identify the unwanted audio portion(s) of the electronic conference. In some embodiments, contextual information regarding the electronic conference (e.g., title of the meeting, content of the conversation, content of the data being shared (e.g., in a document), location of a meeting, etc.) may be used to more accurately determine audio portion(s) that are unwanted. As a nonlimiting example, music sound may conventionally be identified as unwanted audio portion during the electronic conference, however, further processing of contextual information such as "music lesson" as the title of the meeting can be used to determine that the audio portion in fact is associated with music lesson and is wanted audio portion and should not be suppressed as unwanted audio whereas contextual information such as "product release" as the title of the meeting can be used to determine with higher confidence that the audio portion associated with music is unwanted. It is appreciated that in another nonlimiting example a user may be in a café, as determined by processing the video data captured by the camera. Awareness of the user's environment, e.g., being in a café, along with the contextual information such as "product release" as the title of the meeting can be used to determine with higher confidence that the identified music sound in the background is unwanted audio and should be suppressed. It is appreciated that the contextual information may also include the content of the meeting, e.g., exchanged information such as documents, video, or audio communication (i.e. spoken word during the electronic conference), etc. In one nonlimiting example, a user in the electronic conference may indicate to other users "what is that music?" or "the background music is disruptive", and as such processing of this contextual information can be used to determine that the music sound in the electronic conference is unwanted and remedial action needs to be taken. In yet another nonlimiting example, a participant may indicate to the speaker that "could you please repeat what you said, there was a bypassing train sound on your side" or "could you please repeat there was a bypassing train here", and as such processing of this contextual information can be used to determine the unwanted audio portion and to take appropriate remedial action(s). Similarly, the content of the data being shared, e.g., in a document, may be used to determine whether the detected audio portion is unwanted and whether it needs to be suppressed. As a nonlimiting example, the content of the data being shared may include music notes and as such highly suggestive that the electronic conference is associated with music and as such detected music portions are wanted. As yet another nonlimiting example, contextual information such as location of the meeting indicating "music studio" may be indicative of the fact that the electronic conference is associated with music and as such audio portion associated with music is in fact wanted and should not be suppressed. It is appreciated that in some embodiments, the wanted audio portion may be identified as opposed to the unwanted audio portion(s), as described above. For example, a user may be close to a train station where trains are passing by and discussing car engine troubles over the phone. As such, the engine sound that normally would be identified as unwanted audio portion is identified as wanted audio portion based on the context of the meeting, e.g., title of the meeting, content of the conversation, etc. As such, the engine sound is not suppressed but other audio data portions, e.g., train passing by, may be suppressed.

It is appreciated that in some embodiments, one or more actions taken by a user during the electronic conference may be detected, e.g., by capturing video data, and used to determine whether a portion of the audio data is unwanted and whether it should be suppressed. In some embodiments, lip movements by the user may be detected, e.g., using a camera, and as such if user's lips are not moving then any spoken word as captured by the microphone of the user's device may be determined to be unwanted. In contrast, in some embodiments, lip movements by the user may be detected, e.g., using a camera, and as such the captured audio data associated with that can be identified as wanted audio portion and will not be suppressed whereas other audio portions may be suppressed. It is appreciated that in certain embodiments, directional microphone or utilization of a dual microphone may be leveraged to determine whether the user is talking, and if it is determined that the user is talking then it is determined that the detected audio is wanted audio, otherwise it is unwanted audio. In some embodiments, the direction of the audio data received by the microphone may be used to determine whether the user is talking into the microphone (i.e. wanted audio) or whether the user is talking in a direction away from the microphone (i.e. unwanted audio). It is appreciated that certain microphones, such as dual microphone, are discussed for illustrative purposes and should not be construed as limiting the scope of the embodiments. For example, any number of microphones, e.g., N number of microphones, may similarly be used.

In some embodiments, multiple microphones may be used concurrently to determine a speech vector, and determine, based on the speech vector, whether the audio is wanted or unwanted. In one example embodiment, a parent, engaged in remote work, uses a conferencing application through a first device associated with first microphone in one room of the house. Meanwhile a child, engaged in distance learning, uses the same conferencing application through a second device associated with a second microphone in another room of the same house. In this example, unique identifiers, such as IP (Internet Protocol) addresses, MAC (Media Access Control) addresses, other hardware identifiers, or any other identifiers associated with both devices are sent to a conferencing server associated with the conferencing application during their respective conferencing sessions. These identifiers allow the conferencing server to identify the source location of both devices. In this example, the first device may be in Location A while the second device is in Location B. If the parent turns away from the first device's microphone and shouts toward the second device's microphone to ask the child to quiet down, then the audio data from both microphones may be sent to the conferencing server for processing. The conferencing server may determine that there is a sudden decrease in audio data (e.g. decrease in total binary data) coming from the first device and a simultaneous increase in audio data (e.g. increase in total binary data) coming from the second device, which enables to server to identify a speech vector away from the first device in Location A and toward the second device in Location B. In this example, the conferencing server may determine that this shift in speech vector indicates unwanted noise coming from the direction in which the speech is directed to (e.g. Location B) and mute any unwanted noise coming from that direction or location.

As yet another nonlimiting example, during the electronic conference someone other than the user, e.g., someone in the user's household, may be talking on the phone and those spoken words are being captured by the microphone of the user's electronic device. However, detecting that the user's lips are not moving suggests that the detected spoken words captured by the user's electronic device are unwanted and may need to be suppressed. It is appreciated that user device's microphone may similarly be utilized to determine whether the source of the captured audio is from the user or someone else, and if it is determined that it is from someone else then the captured audio may be suppressed. It is further appreciated that in some embodiments, an audio voice associated with each user or majority of the users may be stored in a server. As such, voice recognition may be performed on the captured audio data and in response to a mismatch, that portion of the audio data is identified as unwanted and appropriate remedial action may be taken.

It is appreciated that in some embodiments, actions taken by the user may include muting/unmuting pattern by the user. The pattern of muting/unmuting may be used to determine whether a portion of the audio data is unwanted and may need to be suppressed. As a nonlimiting example, an input mechanism of the user electronic device may be used to determine whether the user is entering data (e.g., typing on a keyboard) while muted and a pattern may be detected. In some embodiments, a machine learning (ML) algorithm may be used for detecting muting/unmuting pattern and automatically mute the user when the user is typing. It is appreciated that the pattern may be from the electronic conference that the user is attending and/or from a history of other electronic conferences attended. It is appreciated that in some embodiments, user action may be the user inputting data (e.g., user entering data using a keyboard, camera capturing a user tapping on a smart phone, etc.), and depending on the type of action, e.g., typing, it may be determined whether a portion of the audio data is unwanted, e.g., the sound of tapping on the keyboard. Identification of a portion of the audio data that is unwanted or wanted enables a remedial action to be taken, e.g., particular audio data associated with tapping on the keyboard may be filtered, the user may be muted, etc.

It is also appreciated that in some embodiments, the action taken by the user may be the direction at which the user is looking at, e.g., looking away from the camera, looking to the right/left, looking to the back, etc., as captured by the camera that once processed can be used to determine whether the captured audio data or a portion thereof is unwanted. In some nonlimiting examples the user may be looking to the left to place an order at a restaurant, the user may be looking to the right and talking to his/her child, etc., and as such processing the direction at which the user is looking at can be used to determine whether the audio data or a portion thereof as captured by the microphone is unwanted. In contrast, if the user is looking at the camera then the audio portion captured may be identified as wanted audio portion. As such, appropriate remedial action may be taken.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "rendering," "utilizing," "launching," "calling," "starting," "accessing," "sending," "conferencing," "triggering," "ending," "suspending," "terminating," "monitoring," "displaying," "removing," "suppressing," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1 is a diagram showing an example of user participating in an electronic conference and identification of unwanted audio portion during the electronic conference according to some embodiments. In this nonlimiting example, a user 110 may join an electronic conference, e.g., voice call, video conference call, webinar, etc., using the electronic device 120. It is appreciated that the electronic device 120 may be any electronic device, e.g., a laptop, smart phone, tablet, etc. In some embodiments, a conferencing system 170, e.g., a web-based server, facilitates the electronic conference between user 110 and other users, e.g., user 182, user 183, . . . , user 189, of the electronic conference. Accordingly, audio data, video data, and/or other types of data may be exchanged (e.g., files shared, text messages, etc.) among users.

In this nonlimiting example, user 110 is in an environment close to a train station 140, a train 130, and vehicles 150 and 160. It is also appreciated that other users 182, 183, . . . , 189 are similarly in their respective environment. Accordingly, awareness of each user environment during the electronic conference can be used to determine whether a captured audio data or a portion thereof is unwanted. If a portion of the audio data is unwanted then remedial action can be taken, e.g., the unwanted audio portion can be filtered out or suppressed, the user may be muted during the time associated with the unwanted audio data, etc.

As described above, awareness of each user environment during the electronic conference can be used to determine unwanted audio portion(s). It is appreciated that the embodiments are described with respect to identifying unwanted audio portion(s) for illustrative purposes and should not be construed as limited thereto. For example, instead of identifying unwanted audio portion(s), the embodiments may identify the wanted audio portion(s) instead. In this example, a camera on the electronic device 120 associated with the user 110 can be used to stream video data, e.g., video stream or still picture, regarding the user 110 environment. For example, a video data 134 associated with the train 130, a video data 144 associated with the train station 140, a video data 154 associated with vehicle 150, a video data 164 associated with vehicle 160, and a video data 114 associated with the user 110 are captured by the camera of the electronic device 120. Processing of the received video data, e.g., by a processor, identifies the environment of user 110. In this nonlimiting example, the environment of the user 110 is identified as including the train 130, vehicles 150 and 160, and the train station 140. As such, awareness of the environment aids in identifying a type of audio data or portion thereof that may be unwanted, e.g., horn, train passing by, crossing signal, etc. It is appreciated that the video data may be processed by the electronic device 120 in one nonlimiting example and in some embodiments the video data may be transmitted from the electronic device 120 to the conferencing system 170 for processing. It is appreciated that as described above, GPS or base station triangulation, etc., may also be used to identify the user's environment.

It is appreciated that in some embodiments, various audio data is also captured by the electronic device 120 of the user 110. For example, an audio data 132 associated with the train 130, an audio data 142 associated with the train station 140, an audio data 152 associated with vehicle 150, an audio data 162 associated with vehicle 160, and an audio data 112 associated with the user 110 are captured by a microphone of the electronic device 120. It is appreciated that the video data may be captured during the electronic conference or prior to the start of the electronic conference. It is appreciated that the received audio data is captured by the microphone during the electronic conference. In this nonlimiting example, the user 110 is talking during the electronic conference and the audio data 112 is data associated with the user 110 talking.

It is appreciated that the video data 114 may be processed to determine one or more actions taken by the user 110. It is appreciated that the actions taken by the user, as identified, can be used to make a determination whether the captured audio data or a portion thereof is unwanted and whether remedial action(s) should be taken. For example, the video data 114 may be used to determine whether the user's 110 lips are moving, e.g., talking. If the user's 110 lips are not moving then it can be determined that any audio data captured by the microphone on the electronic device 120 is unwanted audio, as an example. It is appreciated that in certain embodiments, directional microphone or utilization of a dual microphone may be leveraged to determine whether the user is talking and if it is determined that the user is talking then it is determined that the detected audio is wanted audio otherwise it is unwanted audio. It is appreciated that voice recognition may further be used to determine whether the captured audio is from the user 110 or someone else in the user's 110 environment, e.g., someone on the bus, someone in user's 110 office, someone in user's 110 household, etc. According to some embodiments, a voice signature associated with each user may be stored (also referred to as voice signature) in order to compare it to the captured audio data. In response to a match between the voice signature (previously stored) and the captured audio data, e.g., audio data 112, 132, 142, 152, 162, etc., it can be determined that the captured audio is from the user 110 and in response to a mismatch it can be determined that the captured audio is not from the user 110 and may need to be suppressed. It is appreciated that in some embodiments, a portion of the captured audio that does not match the user's 110 voice signature may be suppressed and filtered out (i.e. audio data 132, 142, 152, and 162 are filtered out and the audio data 112 remains).

It is appreciated that, as discussed above, one or more portions of the audio data may be identified as wanted as opposed to unwanted (described above). For example, the video data may be used to show that the user 110 is holding the electronic device 120 in the direction of a car engine. Accordingly, the audio data captured as engine noise may be identified as wanted audio portion since it appears that the user 110 is purposefully transmitting the sound of the engine. Accordingly, the audio portion captured associated with the sound of the engine may be designated as wanted audio portion while a sound of the train passing by may be identified as unwanted audio portion and suppressed.

It is appreciated that in some embodiments, actions taken by the user 110 may include muting/unmuting pattern by the user. The pattern of muting/unmuting may be used to determine whether a portion of the audio data is unwanted and may need to be suppressed as opposed to wanted audio portion. As a nonlimiting example, an input mechanism of the user electronic device (e.g., touch screen, keyboard, camera, etc.) may be used to determine whether the user is entering data (e.g., typing on a keyboard) while muted and the pattern may be detected. In some embodiments, ML algorithm is used to identify a pattern of muting/unmuting when the user is typing. It is appreciated that the pattern may be from the electronic conference that the user is attending and/or from a history of attending other electronic conferences. It is appreciated that in some embodiments, user action may be the user inputting data (e.g., user entering data using a keyboard, camera capturing a user tapping on a smart phone, etc.) and depending on the type of action, e.g., typing, it may be determined whether a portion of the audio data is unwanted, e.g., the sound of tapping on the keyboard. Identification of a portion of the audio data that is unwanted enables a remedial action to be taken, e.g., particular audio data associated with tapping on the keyboard may be filtered, the user may be muted, etc.

It is also appreciated that in some embodiments, the action taken by the user 110 may be the direction at which the user is looking at, e.g., looking away from the camera, looking to the right/left, looking to the back, etc., as captured by the camera of the electronic device 120. The processing of the video data 114 that determines the direction at which the user 110 is looking is used to determine whether the captured audio data or a portion thereof is unwanted. In some nonlimiting examples the user may be looking to the left to place an order at a restaurant, the user may be looking to the right and talking to his/her child, etc., and as such processing the direction at which the user is looking at can be used to determine whether the audio data or a portion thereof as captured by the microphone is unwanted. As such, appropriate remedial action may be taken. In some embodiments, the processing of the video data 114 determines the direction at which the user 110 is looking to determine whether the captured audio data or portion thereof is wanted. For example, if the user 110 is looking at the camera then audio data associated with spoken words from the user 110 may be identified as wanted audio portion. Similarly, if the user 110 is looking down at a piece of paper and appears to be reading from it then the spoken words associated with that may be identified as wanted audio portion. Accordingly, the wanted audio portion is maintained while the remainder of the captured audio data (i.e. unwanted audio portion) may be suppressed.

In some embodiments, the action taken by the user 110 may be spoken words as captured by the microphone of the electronic device 120. The captured audio data 112 containing the spoken words may be processed to identify the context and content of the spoken words. The captured audio data 112 even if spoken by the user 110 may be determined to be unwanted audio if it is determined to be unrelated to the electronic conference, e.g., the electronic conference may be regarding a product release but the audio data 112 as captured by the microphone of the electronic device 120 may be placing an order for a latte. It is appreciated that in some embodiments, as described above, portions of the audio data that are wanted may similarly be identified and audio portions other than the wanted portion may be suppressed. As an example, the action taken by the user 110 may be spoken words as captured by the microphone of the electronic device 120 and the captured audio data 112 may contain spoken words in the context of a car engine and the sound it makes. As such, the sound of the car engine that normally be viewed as unwanted audio portion may be identified as wanted audio portion. As such, the car engine sound may be maintained while other audio data portions may be suppressed.

It is appreciated that user's environment along with other types of information can be used to more accurately identify whether the captured audio data or a portion thereof is unwanted or wanted. In some embodiments, contextual information regarding the electronic conference (e.g., title of the meeting, content of the conversation during the electronic conference, content of the data being shared (e.g., in a document), location of a meeting, etc.) may be used to more accurately determine audio portion(s) that are unwanted as opposed to wanted. It is appreciated that the identified user's environment and/or actions taken by the user and/or contextual data associated with the electronic conference may be used to identify whether the captured audio data or a portion thereof is unwanted or wanted. As an example, the title of the meeting may be "product release" and as such a captured audio data 112 placing an order for a latte is determined to be unwanted. As another nonlimiting example, a title of a meeting "car trouble" may be used along with the captured audio data from a car engine to determine that the captured car engine audio is wanted audio as opposed to the sound of the train passing by.

In this nonlimiting example, audio data 112, 132, 142, 152, and 162 are captured by the electronic device 120 during the electronic conference. The processing of the user's 110 environment determines that the user 110 is outside, close to the train station 140, with the train 130 passing by, as well as close to vehicles 150 and 160. The title of the meeting may be "product release 2.0" and a word document containing the specification for the product release 2.0 may have been shared in the calendar invite for the electronic conference, are contextual data. The user 110 may be raising his/her hand to catch a cab, as captured by the video data 114 and/or video data 164. In some nonlimiting examples, the audio data 112 is processed and reveals that the user 110 is discussing a provision within the product release 2.0 and the video data 114 processing determines that the user's 110 lips are moving. The environment of the user 110, the action(s) taken by the user 110, and the contextual data processing determines that audio data 132, 142, 152, and 162 are unwanted audio data and that remedial action(s) should be taken, e.g., filtered out, suppressed, etc.

In some embodiments the audio data 112 is identified as the wanted audio portion and is therefore maintained while audio data 132, 142, 152, and 162 are suppressed or filtered out (either because they are determined to be unwanted audio portion or because they are audio portions other than audio data 112 and therefore suppressed). In one nonlimiting example, the audio data 132, 142, 152, and 162 are suppressed while audio data 112 is amplified to drown out the unwanted audio data. In some nonlimiting examples, a database of audio data is used to create an appropriate null for unwanted audio data.

It is appreciated that the processing and the remedial action may be performed by the electronic device 120 and as such only audio data 112 is transmitted from the electronic device 120 to the conferencing system 170 and subsequently to the users 182-189. In some nonlimiting examples, the processing may be performed by the conferencing system 170, and as such the captured data (i.e. audio and/or video) is transmitted to the conferencing system 170 for processing where unwanted audio data is suppressed and the wanted audio portion is subsequently transmitted to the users 182-189. It is appreciated that certain processing steps may be performed by the electronic device 120 while other processing steps and/or remedial actions may be performed by the conferencing system 170. It is appreciated that in some embodiments, the duration that the user 110 is communicating audio data 112 may be 45 seconds, however, 10 seconds of which is interrupted with vehicles honking and/or train passing by. It is appreciated that in some nonlimiting examples, the electronic device 120 may be muted for the audio data corresponding to 10 seconds of the 45 seconds that is being interrupted by the vehicles honking and/or train passing by in order to address the interruption. It is appreciated that in some embodiments, the act of muting may occur on the conferencing system 170 instead of the electronic device 120.

In the above nonlimiting example, if the processing of the audio data 112 of the user 110 reveals that the user 110 is not discussing a provision within the product release 2.0 but is rather giving address to the taxi driver, the system instead determines that audio data 112 is also unwanted audio portion. As such, the audio data 112 is also suppressed similar to audio data 132, 142, 152, and 162. In some nonlimiting examples, if it is determined that the audio data 112 is unwanted audio then the electronic device 120 may be muted. Accordingly, disruptions to the electronic conference is reduced.

Figure 2:
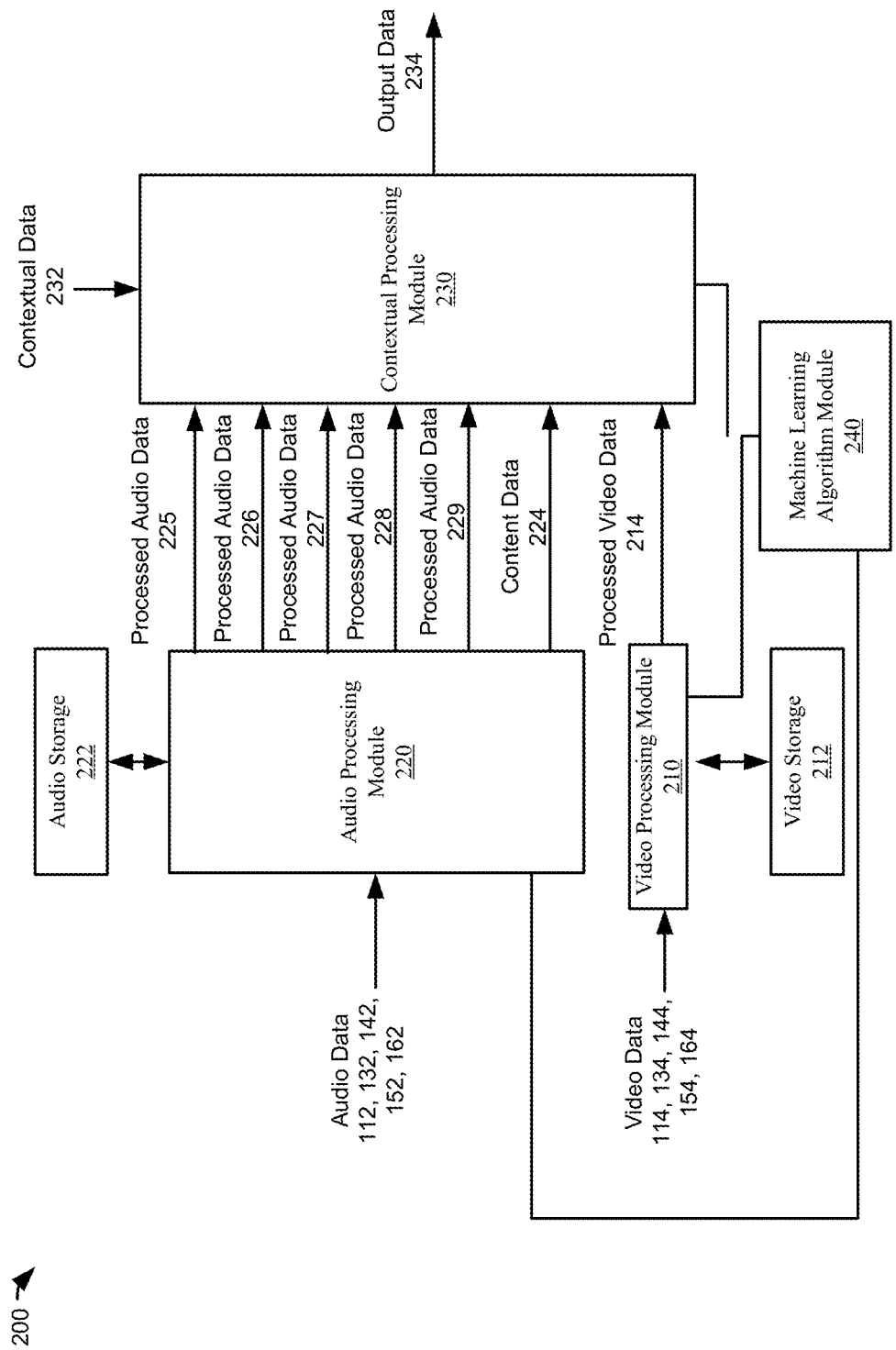
FIG. 2 is a block diagram showing an example of a processing unit for identifying wanted/unwanted audio portions during an electronic conference according to some embodiments.

FIG. 2 is a block diagram showing an example of a processing module 200 for identifying wanted/unwanted audio portions during an electronic conference according to some embodiments. It is appreciated that the processing unit may be within the electronic device 120, conferencing system 170, or a combination thereof. It is further appreciated that the processing unit, as described in FIG. 2, may be a separate processing module from the electronic device 120 and the conferencing system 170.

In this example, the processing unit 200 includes a video processing module 210, an audio processing module 220, a contextual processing module 230, and optionally a machine learning algorithm module 240. In this nonlimiting example, the processing is described with respect to user 110, however, it is appreciated that a similar processing is performed for all other users, i.e. users 182, 183, . . . , 189.

The video processing module 210 receives a plurality of video data, e.g., video data 114, 134, 144, 154, and 164, from the electronic device 120 of user 110 in order to identify the environment in which the user 110 is situated. In some nonlimiting examples, certain processing algorithms may be used to detect instances of semantic objects of a certain class, e.g., human, vehicles, trains, transportation stations, etc. It is appreciated that various video and image processing techniques may be used to identify the user's environment. For example, deep neural network (DNN) may be used to classify the user's environment. A subclass of DNN, convolutional neural network (CNN) may also be used. In some nonlimiting examples, a machine learning approach such as Viola-Jones object detection framework based on Haar features may be used, while in other embodiments scale-invariant feature transform (SIFT) may be used, and yet in other embodiments a histogram of oriented gradient (HOG) features may be used. It is appreciated that the discussed video/image processing algorithms used to identify images within the video frame are provided for illustrative purposes and it is not intended to limit the scope of the embodiments. In some embodiments, a particular machine learning algorithm to be used by the video processing module 210 may be provided from the machine learning algorithm module 240.

The video processing module 210 identifies various objects within the user's environment, e.g., train station, train, buses, vehicles, trees, etc. In some nonlimiting examples, the video processing module 210 accesses a video storage 212 that stores various images and videos. The comparison of the data from the video storage 212 to that of the video data 114, 134, 144, 154, and 164 identifies the objects within the user's environment. It is appreciated that the video processing module 210 may further utilize the machine learning algorithm provided by the machine learning algorithm module 240 in identifying objects within the user's environment.

It is appreciated that processing by the video processing module 210 identifies various objects within the user's environment. As such, the video processing module 210 determines the kind of environment that the user is in, e.g., office environment, at a train station, at home, etc. The video processing module 210 outputs the processed video data 214, which may be the identification of the user's environment. The processed video data 214 is transmitted to the contextual processing module 230 for further processing.

It is appreciated that the audio processing module 220 receives audio data 112, 132, 142, 152, and 162 from the electronic device 120 associated with the user 110. The audio processing module 220 may access an audio storage 222 that stores various audio data. The audio processing module 220 may compare the accessed audio data from the audio storage 222, e.g., sound of the train, car honking, subway noise, etc., to the received audio data 112, 132, 142, 152, and 162 in order to identify different audio data that has been received. It is appreciated that in some nonlimiting examples, machine learning (e.g., machine learning algorithm provided by the machine learning algorithm module 240) may be used in order to process the received audio data 112, 132, 142, 152, and 162. For example, DNN machine learning algorithm may be used or in some embodiments a clustering algorithm may be used to group the received audio data to a known group. In some embodiments, a natural language processing (NLP) may be used to identify the content of the received audio data and to understand the context of the audio data. It is appreciated that NLP may be used in conjunction of audio-to-text processing in order to generate a textual equivalence of the received audio data suited for NLP processing.

The audio processing module 220 may be configured to parse the received audio data into a plurality of audio data. For example, even though the audio data 112, 132, 142, 152, and 162 may have been received as a single audio data (combined), the audio processing module 220 may separate out the identified audio into the processed audio data 225, 226, 227, 228, and 229 and output them to the contextual processing module 230 for further processing. In some embodiments, the processed audio data 225 corresponds to the audio data 112, the processed audio data 226 corresponds to the audio data 132, the processed audio data 227 corresponds to the audio data 142, the processed audio data 228 corresponds to the audio data 152, and the processed audio data 229 corresponds to the audio data 162. It is also appreciated that in some embodiments, the NLP of the received audio deduces the content and context of the audio and the determined content data 224 may be output to the contextual processing module 230 for further processing. It is appreciated that the determined content data 224 identifies the content of the captured audio data, e.g., discussion about car engine, ordering a latte, discussing product release, etc.

The processor 230 may receive the processed audio data 225-229, the content data 224, and the processed video data 214 from the audio processing module 220 and the video processing module 210, respectively. The contextual processing module 230 may also receive other contextual data 232 that may include contextual information regarding the meeting (e.g., title of the meeting, content of the conversation, content of data being shared, location of the meeting, etc.) from the conferencing system 170. The contextual processing module 230, may be based on the context of the electronic conferencing session as identified by the content data 224, the identified environment of the user 110 as determined by the processed video data 214, and further based on other contextual data 232, determine which audio data portions are wanted and which are unwanted. In some embodiments, identifying the wanted audio portion may only be used and everything else may be flagged as unwanted and vice versa. For example, the contextual processing module 230 may determine which of the processed audio data 225-229 are wanted/unwanted audio portions. For example, the contextual processing module 230 determines that the other contextual data 232 includes a meeting title of "some problems with an engine", the audio data (e.g. processed audio data 226) contains sounds of a working engine, and the determined content data 224 obtained from verbal discussions during the meeting include words such as "problems," "engine," and "not normal operation." Based on a combination of processed audio data 226, the determined content data 224, as well as the other contextual data 232, the contextual processing module 230 determines that the processed audio data 226 should be treated as wanted audio data and should not be suppressed.

In another embodiment, different sources of other contextual data 232 can be assigned different levels of importance (e.g. "high" level of importance, "medium" level of importance, "low" level of importance, where, for example, one "high" level of importance source is equal to two "medium" level of importance sources, and one "medium" level of importance source is equal to two "low" level of importance sources). In some embodiments, the content of the conversation can be set "high" level of importance, the title of the meeting and the location of the meeting can be set "low" level of importance. As another example, the contextual processing module 230 can determine that the processed audio data 226 (e.g. working engine audio) should be treated as wanted, even when the title of the meeting is "guitar lesson", the location of the meeting is a musical school, but the content of the conversation contains discussions of engine problems because two "low" importance level sources have less weight than one "high" importance level source. In some embodiments, the contextual processing module 230 takes into consideration processed video data 214 to check and adjust, if necessary, a determination made based on the other contextual data 232. Accordingly, remedial action may be taken as appropriated. For example, wanted audio portions may be kept while unwanted audio portions may be suppressed. In some embodiments, the wanted audio portions may be amplified and/or the unwanted audio portions may be suppressed. The contextual processing module 230 may output the output data 234 that contains the wanted audio data (or the wanted audio data is amplified and/or the unwanted audio data is suppressed). In some embodiments, the levels of importance can be assigned by the contextual processing module 230 or by a user. In other embodiments, the levels of importance can be set in different ways and have different dependencies on each other.

It is appreciated that in some embodiments, the contextual processing module 230 may further utilize machine learning algorithms provided by the machine learning algorithm module 240 to identify a wanted audio portion and/or unwanted audio portion. In some embodiments, the machine learning algorithm may utilize grouping/clustering algorithms that take the contextual data, the identified context, the processed audio data, and the identified environment as their input in order to cluster the processed audio data into various clusters, e.g., wanted and unwanted. As such, the contextual processing module 230 may take appropriate remedial actions to output the appropriate audio as output data 234.

It is appreciated that various processing, as shown, is only for illustrative purposes to show various stages of processing. For example, all of the processing, as discussed, may be performed by one module. It is further appreciated that some processing may be performed by the electronic device 120, some may be performed by the conferencing system 170, and some may be performed by the backend server, or any combination thereof. It is appreciated that a similar process is repeated for each participant of the electronic conferencing session.

Figure 3:
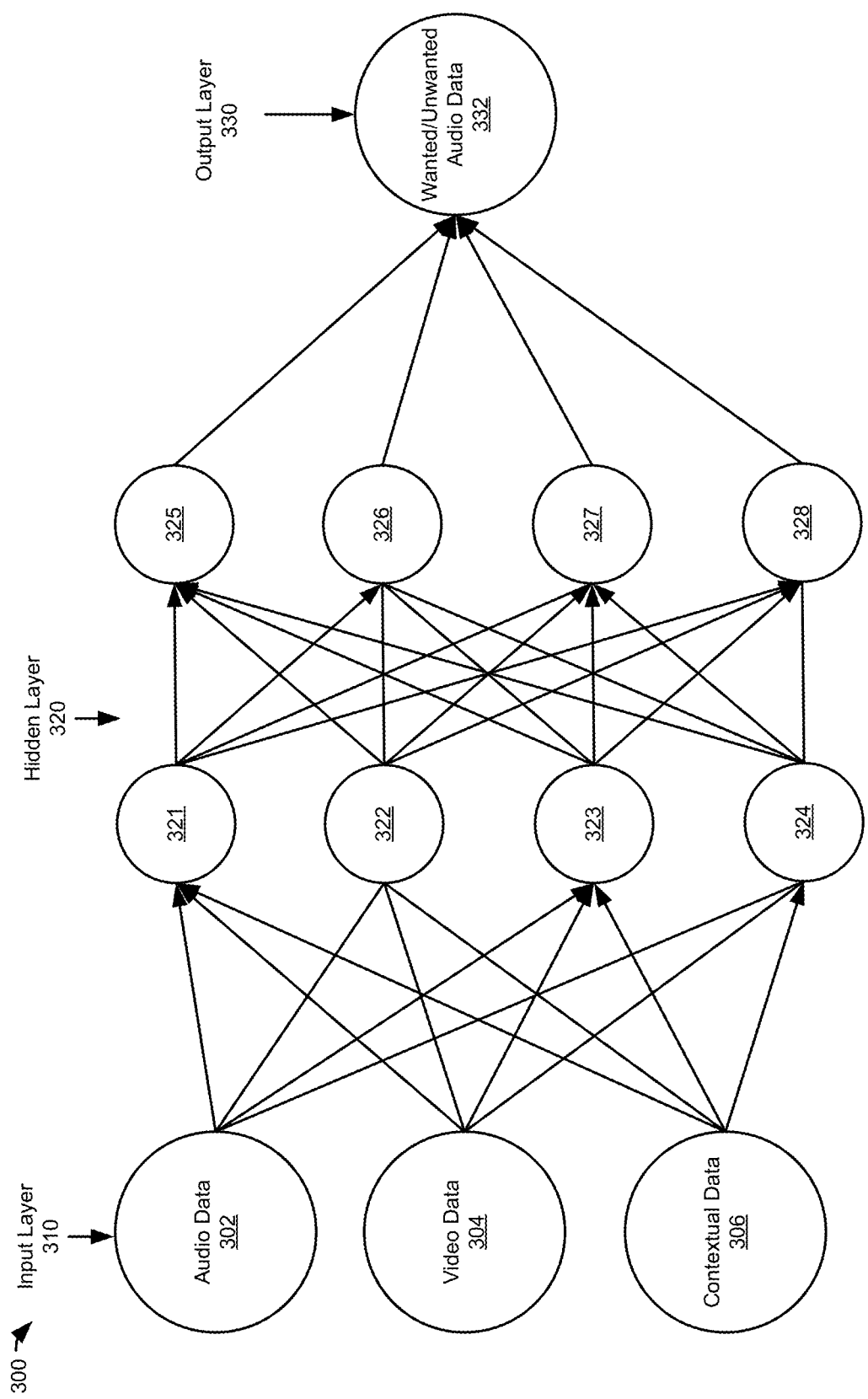
FIG. 3 is a relational node diagram depicting an example of a neural network for identifying wanted/unwanted audio portion during an electronic conferencing session according to some embodiments.

FIG. 3 is a relational node diagram depicting an example of a neural network for identifying wanted/unwanted audio portion during an electronic conferencing session according to some embodiments. In an example embodiment, the neural network 300 utilizes an input layer 310, one or more hidden layers 320, and an output layer 330 to train the machine learning algorithm(s) or model to identify wanted/unwanted audio portions within an electronic conferencing session. In some embodiments, where the wanted/unwanted audio portions, as described above, have already been confirmed, supervised learning is used such that known input data, a weighted matrix, and known output data are used to gradually adjust the model to accurately compute the already known output. Once the model is trained, field data is applied as input to the model and a predicted output is generated. In other embodiments, where the wanted/unwanted audio portions have not yet been confirmed, unstructured learning is used such that a model attempts to reconstruct known input data over time in order to learn. FIG. 3 is described as a structured learning model for depiction purposes and is not intended to be limiting.

Training of the neural network 300 using one or more training input matrices, a weight matrix, and one or more known outputs is initiated by one or more computers associated with the online conferencing system. In an embodiment, a server may run known input data through a deep neural network in an attempt to compute a particular known output. For example, a server uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computer then re-computes another output from the deep neural network with the input training matrix and the adjusted weight matrix. This process continues until the computer output matches the corresponding known output. The server computer then repeats this process for each training input dataset until a fully trained model is generated.

In the example of FIG. 3, the input layer 310 includes a plurality of training datasets that are stored as a plurality of training input matrices in a database associated with the online conferencing system. The training input data includes, for example, audio data 302 from participants of an electronic conferencing session, video data 304 from participants of an electronic conferencing session, and contextual data 306 within conferencing system such as type of the meeting, e.g., product release, hiring interview, one-on-one meeting, etc., and so forth. Any type of input data can be used to train the model.

In an embodiment, audio data 302 is used as one type of input data to train the model, which is described above. In some embodiments, video data 304 are also used as another type of input data to train the model, as described above. Moreover, in some embodiments, contextual data 306 within the conferencing system are also used as another type of input data to train the model, as described above.

In the embodiment of FIG. 3, hidden layers 320 represent various computational nodes 321, 322, 323, 324, 325, 326, 327, 328. The lines between each node 321, 322, 323, 324, 325, 326, 327, 328 represent weighted relationships based on the weight matrix. As discussed above, the weight of each line is adjusted overtime as the model is trained. While the embodiment of FIG. 3 features two hidden layers 320, the number of hidden layers is not intended to be limiting. For example, one hidden layer, three hidden layers, ten hidden layers, or any other number of hidden layers may be used for a standard or deep neural network. The example of FIG. 3 also features an output layer 330 with the identified wanted/unwanted audio data 332 as the known output. The appropriate wanted/unwanted audio data 332 indicates the appropriate wanted as opposed to unwanted audio portions for a given conferencing system. For example, the appropriate wanted audio portion 332 may be a certain content of data based on the contextual data and the input data. As discussed above, in this structured model, the appropriate wanted/unwanted data 332 is used as a target output for continuously adjusting the weighted relationships of the model. When the model successfully outputs the appropriate wanted/unwanted audio data 332, then the model has been trained and may be used to process live or field data.

Once the neural network 300 of FIG. 3 is trained, the trained model will accept field data at the input layer 310, such as audio data and video data from the user 110 electronic device 120, and the contextual data from the conferencing system 170. In some embodiments, the field data is live data that is accumulated in real time. In other embodiments, the field data may be current data that has been saved in an associated database. The trained model is applied to the field data in order to generate one or more wanted/unwanted audio portions at the output layer 330. Moreover, a trained model can determine that changing wanted/unwanted audio portion(s) is appropriate as more data is processed and accumulated over time. Consequently, the trained model will determine the appropriate active participant action(s) over time.

It is appreciated that the machine learning algorithm and the description of its training is given with respect to the contextual processing module 230. However, it is appreciated that a similar process may be repeated to derive an appropriate model for the audio processing module 220 and the video processing module 210 respectively. It is further appreciated that the derived models for each processing unit may be stored in the machine learning algorithm module 240 for execution by the respective processing unit once live data is being received.

Figure 4:
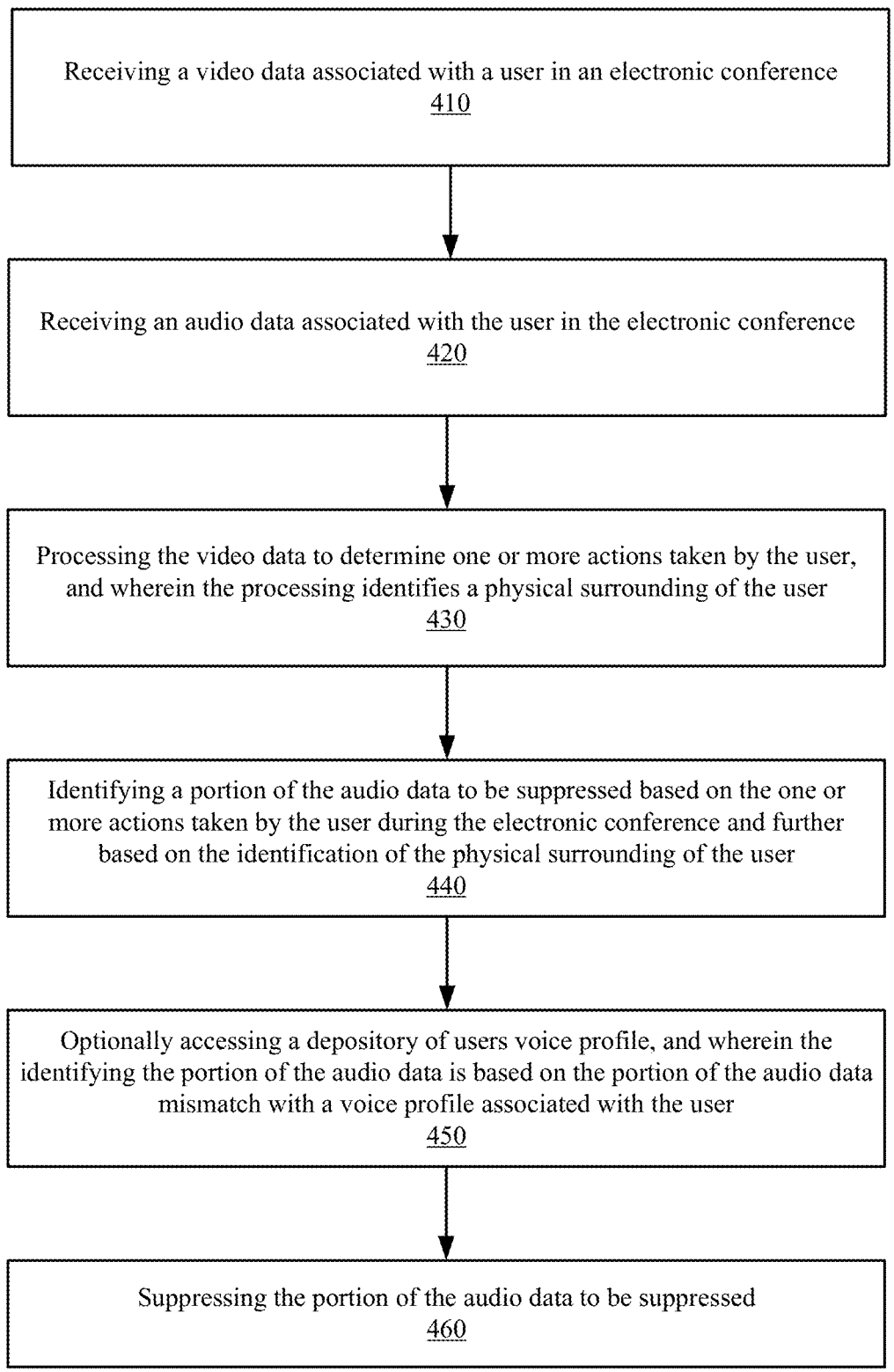
FIG. 4 is a flow chart illustrating an example of method flow for determining unwanted audio portion of an electronic conference and taking remedial action associated therewith in accordance with some embodiments.

FIG. 4 is a flow chart illustrating an example of method flow for determining unwanted audio portion of an electronic conference and taking remedial action associated therewith in accordance with some embodiments. At step 410, a video data associated with a user in an electronic conference, e.g., video conference, audio conference, webinar, etc., is received. At step 420, an audio data associated with the user in the electronic conference is received. In some embodiments, at step 430, the video data is processed to determine one or more actions taken by the user, as described above. It is appreciated that the processing of the video data identifies a physical surrounding of the user. At step 440, a portion of the audio data to be suppressed is identified based on the one or more actions taken by the user, e.g., direction at which the user is looking, whether the user is typing, whether lips of the user are moving, muting/unmuting during the electronic conference, spoken words by the user, etc., during the electronic conference and further based on the identification of the physical surrounding of the user. In some nonlimiting examples, identifying a portion of the audio data to be suppressed may be further based on a contextual data, e.g., a title of the electronic conference, a content exchanged between users of the electronic conference, etc., associated with the electronic conference, as described above. It is appreciated that in some embodiments, identifying the portion of the audio data to be suppressed may be based on the directional angle of the audio data received by the microphone and agnostic to the content of the audio data. It is appreciated that in some embodiments, at step 450 a depository of user voice profiles is optionally accessed. In some nonlimiting examples, identifying the portion of the audio data to be suppressed may be based on the portion of the audio data mismatch with a voice profile associated with the user. It is appreciated that at step 460, the portion of the audio data to be suppressed may be suppressed.

According to some nonlimiting examples, the received audio data is processed using ML algorithms to identify a pattern associated with unwanted audio data, e.g., muting/unmuting patter, typing pattern, direction at which the user typically looks during a conference meeting, etc. It is further appreciated that in some embodiments, the portion of the audio data to be suppressed is identified based on the portion of the audio data matching the pattern associated with unwanted audio data, according to ML algorithms. It is further appreciated that identifying the portion of the audio data to suppress further includes applying an ML algorithm to the audio data, where the ML algorithm is based on one or more actions of the user in one or more electronic conferences other than the electronic conference (e.g., from prior electronic conferences) and whether it matches the current actions by the user.

Figure 5:
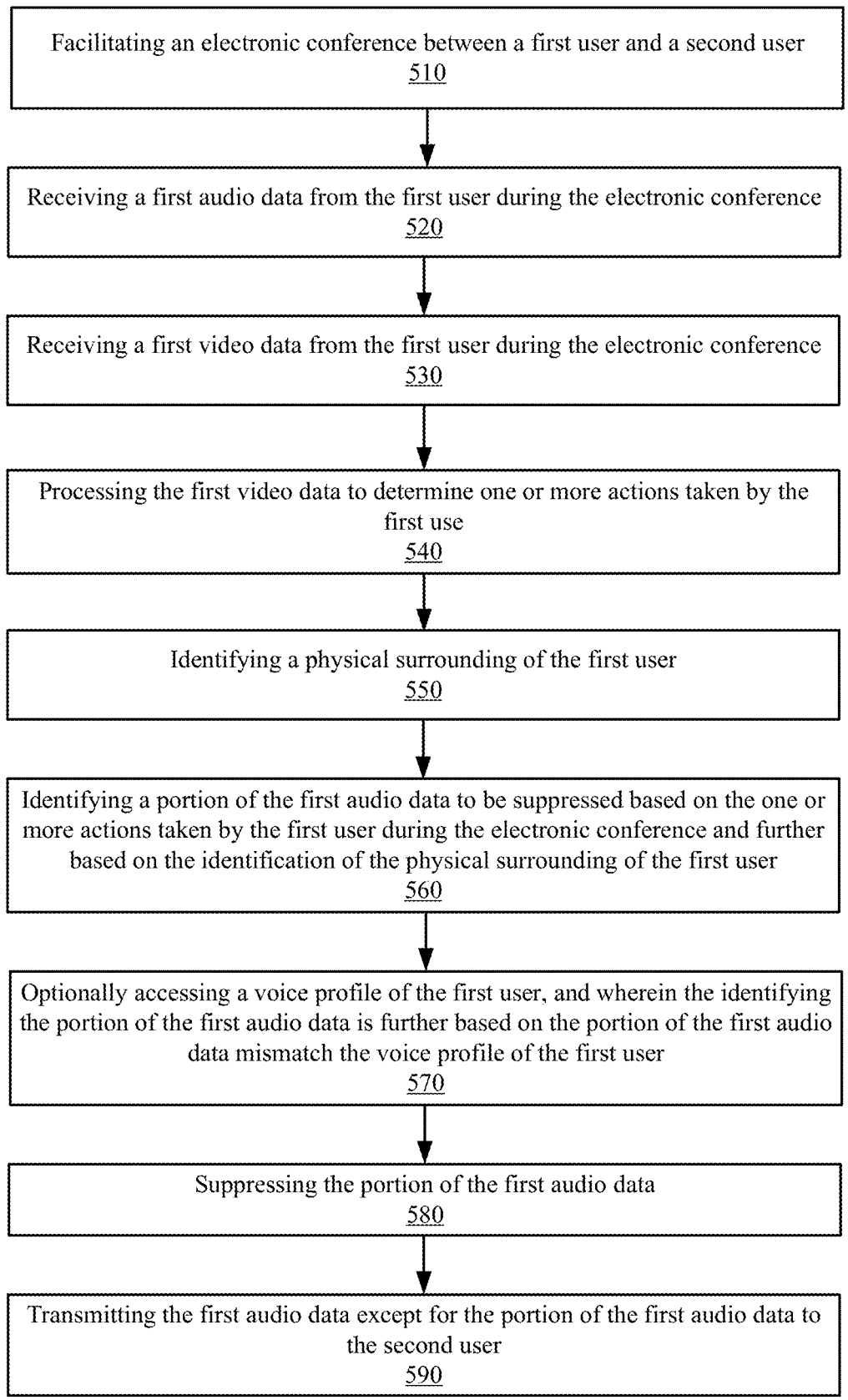
FIG. 5 is another flow chart illustrating an example of method flow for determining unwanted audio portion of an electronic conference and taking remedial action associated therewith in accordance with some embodiments.

FIG. 5 is another flow chart illustrating an example of method flow for determining unwanted audio portion of an electronic conference and taking remedial action associated therewith in accordance with some embodiments. At step 510, an electronic conference between a first user and a second user is facilitated. At step 520, a first audio data from the first user during the electronic conference is received. At step 530, a first video data from the first user during the electronic conference is received. At step 540, the first video data is processed to determine one or more actions taken by the first use, as described above. At step 550, a physical surrounding of the first user is identified. It is appreciated that in some embodiments at step 560, a portion of the first audio data to be suppressed is identified based on the one or more actions taken by the first user during the electronic conference and further based on the identification of the physical surrounding of the first user. In some embodiments, a contextual data associated with the electronic conference is used to identify a portion of the first audio portion to be suppressed. In some nonlimiting and optional examples, at step 570, a voice profile of the first user is accessed and the portion of the first audio data to be suppressed is determined partially based on whether the portion of the first audio data mismatch the voice profile of the first user. At step 580, a portion of the first audio data as identified is suppressed. In some embodiments, at step 590, the first audio data is transmitted except for the portion of the first audio data to the second user.

Figure 6:
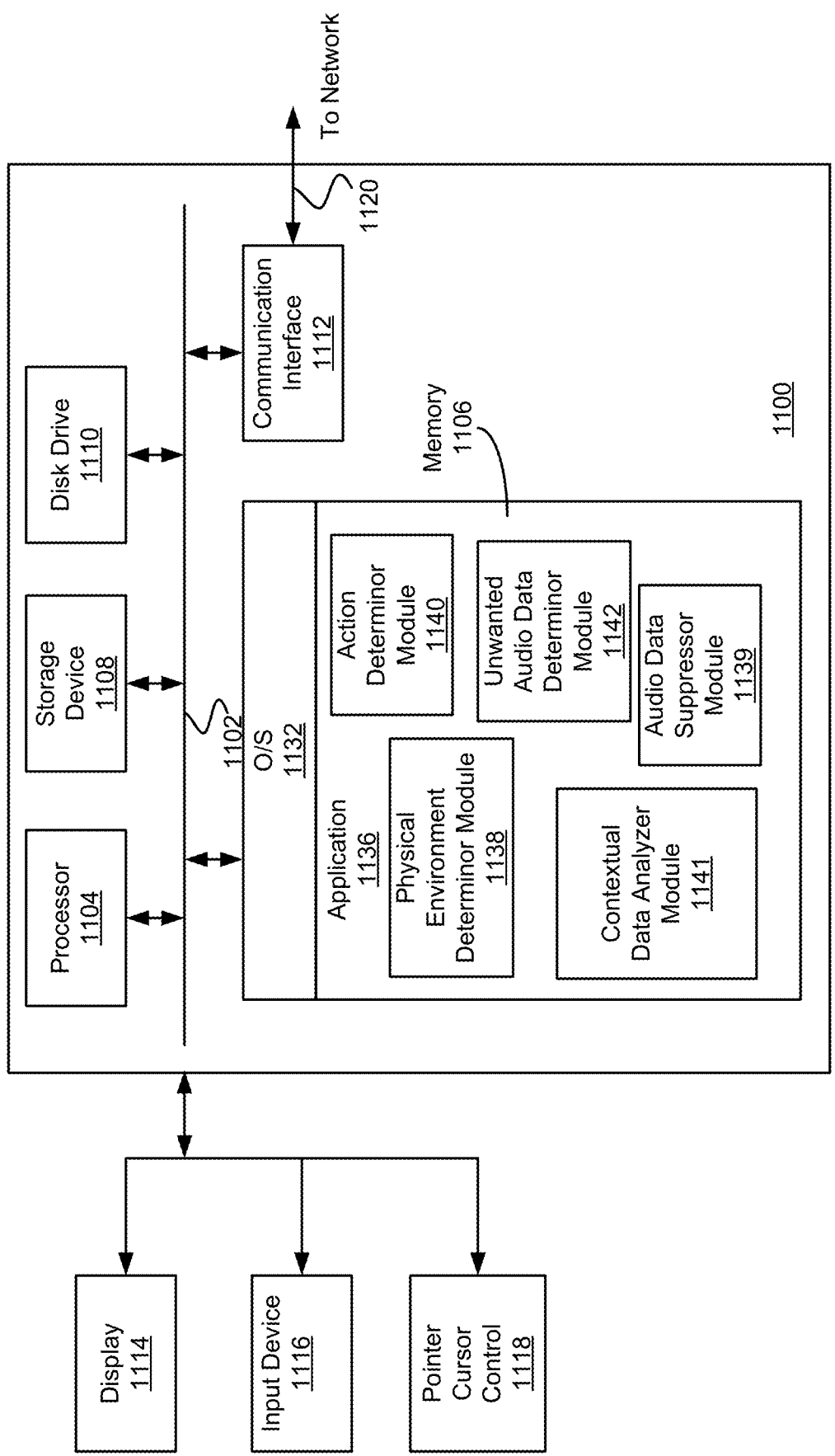
FIG. 6 is a block diagram depicting an example of computer system suitable for determining unwanted audio portion of an electronic conference and taking remedial action associated therewith in accordance with some embodiments.

Referring now to FIG. 6, an exemplary block diagram of a computer system suitable for determining unwanted audio portion of an electronic conference and taking remedial action associated therewith in accordance with some embodiments. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operating system ("OS") 1132, an application 1136 (e.g., a host, server, web services-based, distributed (i.e., enterprise) application programming interface ("API"), program, procedure or others). Further, application 1136 includes a module of executable instructions for physical environment determinator module 1138 that determines the physical environment of the user, contextual data analyzer module 1141 to determine the context of the electronic conference, action determinor module 1140 to identify actions taken by the user, unwanted audio data determinor module 1142 to identify a portion of the audio data that is unwanted, and an audio data suppressor module 1139 that suppresses the identified audio data.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:
1. A method, comprising:
receiving a video data associated with a user in an electronic conference;
receiving an audio data associated with the user in the electronic conference;

processing the video data to determine one or more actions taken by the user, and wherein the processing identifies a physical surrounding of the user; and identifying a portion of the audio data to be suppressed based on the one or more actions taken by the user during the electronic conference and further based on the identification of the physical surrounding of the user.

2. The method as described in claim 1, wherein the electronic conference is a video conference, an audio conference, or a webinar.

3. The method as described in claim 1, further comprising: suppressing the portion of the audio data to be suppressed.

4. The method as described in claim 1, wherein the identifying is further based on a contextual data associated with the electronic conference.

5. The method as described in claim 4, wherein the contextual data includes a title of the electronic conference and a content exchanged between users of the electronic conference.

6. The method as described in claim 1, wherein the one or more actions taken by the user is a direction at which the user is looking, whether the user is typing, or whether lips of the user are moving.

7. The method as described in claim 1, wherein the one or more actions taken by the user is a pattern of muting/unmuting during the electronic conference.

8. The method as described in claim 1, wherein the identifying is further based on a direction from which the audio data is received.

9. The method as described in claim 1, further comprising:
accessing a depository of users voice profile, and wherein the identifying the portion of the audio data is based on the portion of the audio data mismatch with a voice profile associated with the user.

10. The method as described in claim 1, further comprising:
processing the received audio data using a machine learning algorithm to identify a pattern associated with unwanted audio data; and
identifying the portion of the audio data to be suppressed based on the portion of the audio data matching the pattern associated with unwanted audio data.

11. The method as described in claim 1, wherein the identifying the portion of the audio data further includes applying a machine learning algorithm to the audio data, wherein the machine learning algorithm is based on one or more actions of the user in one or more electronic conferences other than the electronic conference, wherein applying the machine learning algorithm identifies whether the one or more actions taken by the user during the electronic conference matches a pattern associated with the one or more actions of the user in the one or more electronic conferences other than the electronic conference.

12. The method as described in claim 1, wherein the identifying is further based on a direction from which a portion of the audio data is received, wherein the portion of the audio is generated by the user.

13. A web-based server for determining a portion of an audio data to be suppressed, comprising:
a memory storing a set of instructions; and
at least one processor configured to execute the instructions to:
facilitate an electronic conference between a first user and a second user;
receive a first audio data from the first user during the electronic conference;
receive a first video data from the first user during the electronic conference;
process the first video data to determine one or more actions taken by the first user;
identify a physical surrounding of the first user; and
identify a portion of the first audio data to be suppressed based on the one or more actions taken by the first user during the electronic conference and further based on the identification of the physical surrounding of the first user.

14. The web-based server as described in claim 13, wherein the processor is configured to suppress the portion of the first audio data.

15. The web-based server as described in claim 14, wherein the processor is configured to cause transmission of the first audio data except for the portion of the first audio data to the second user.

16. The web-based server as described in claim 13, wherein the processor is further configured to identify the portion of the first audio data based on a contextual data associated with the electronic conference, wherein the contextual data includes a title of the electronic conference and a content exchanged between users of the electronic conference.

17. The web-based server as described in claim 13, wherein the one or more actions taken by the first user is a direction at which the first user is looking, whether the first user is typing, whether lips of the first user are moving, or a pattern of muting/unmuting during the electronic conference.

18. The web-based server as described in claim 13, wherein the processor is configured to access a voice profile of the first user, and wherein the identifying the portion of the first audio data is based on the portion of the first audio data mismatch the voice profile of the first user.

19. A method, comprising:
facilitating an electronic conference between a first user and a second user;
receiving a first audio data from the first user during the electronic conference;
receiving a first video data from the first user during the electronic conference;
processing the first video data to determine one or more actions taken by the first user;
identifying a physical surrounding of the first user; and
identifying a portion of the first audio data to be suppressed based on the one or more actions taken by the first user during the electronic conference and further based on the identification of the physical surrounding of the first user.

20. The method as described in claim 19, further comprising: suppressing the portion of the first audio data.

21. The method as described in claim 20, further comprising: transmitting the first audio data except for the portion of the first audio data to the second user.

22. The method as described in claim 19, wherein the identifying the portion of the first audio data is further based on a contextual data associated with the electronic conference, wherein the contextual data includes a title of the electronic conference and a content exchanged between users of the electronic conference.

23. The method as described in claim 19, wherein the one or more actions taken by the first user is a direction at which the first user is looking, whether the first user is typing, whether lips of the first user are moving, or a pattern of muting/unmuting during the electronic conference.

24. The method as described in claim 19, further comprising: accessing a voice profile of the first user, and wherein the identifying the portion of the first audio data is further based on the portion of the first audio data mismatch the voice profile of the first user.

\* \* \* \* \*